(No Model.) 2 Sheets—Sheet 1.
J. P. JOHNSON.
FIELD WEEDER.
No. 345,903. Patented July 20, 1886.
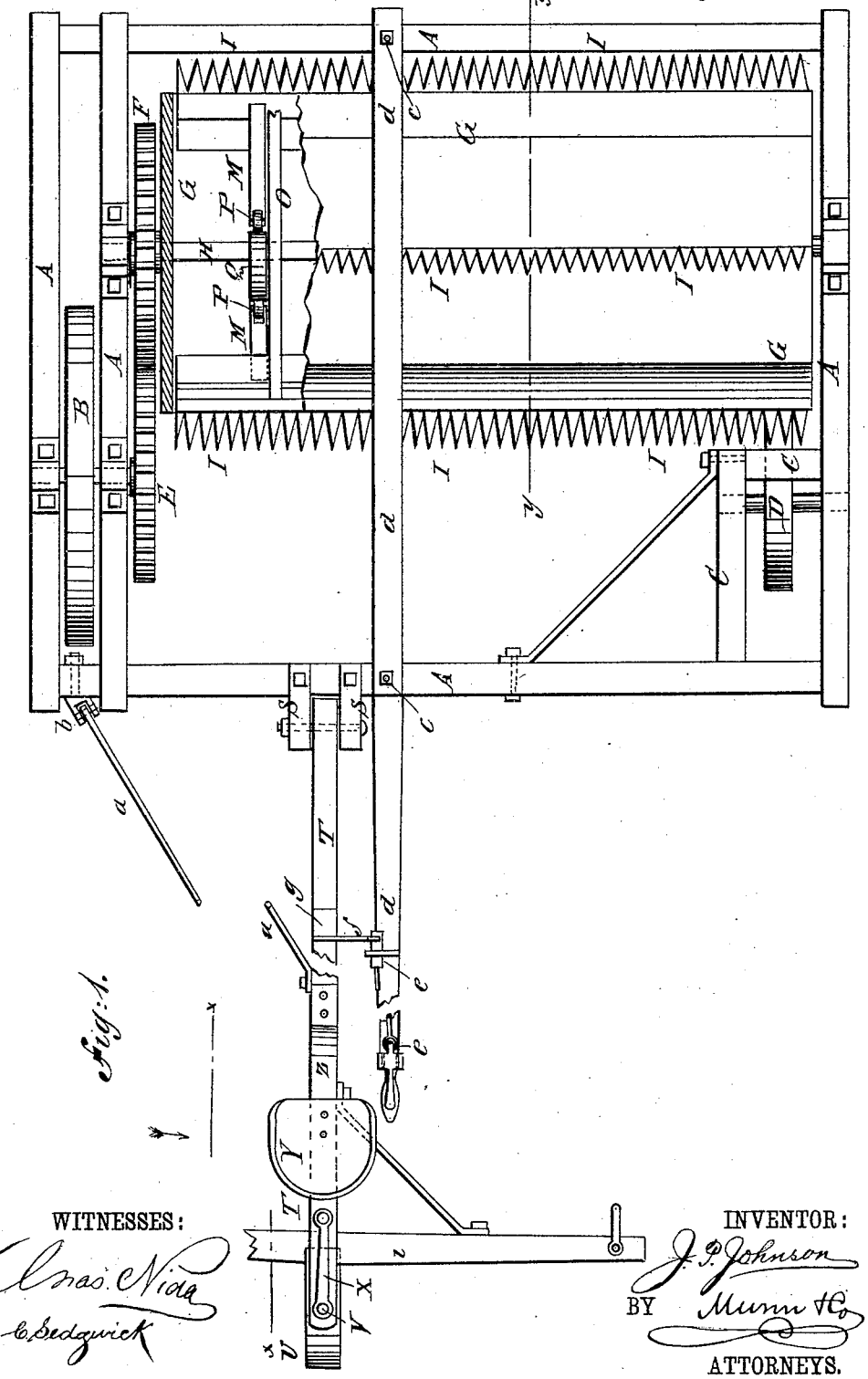
WITNESSES:
Chas. Nida
C. Sedgwick
INVENTOR:
J. P. Johnson
BY Munn & Co.
ATTORNEYS.

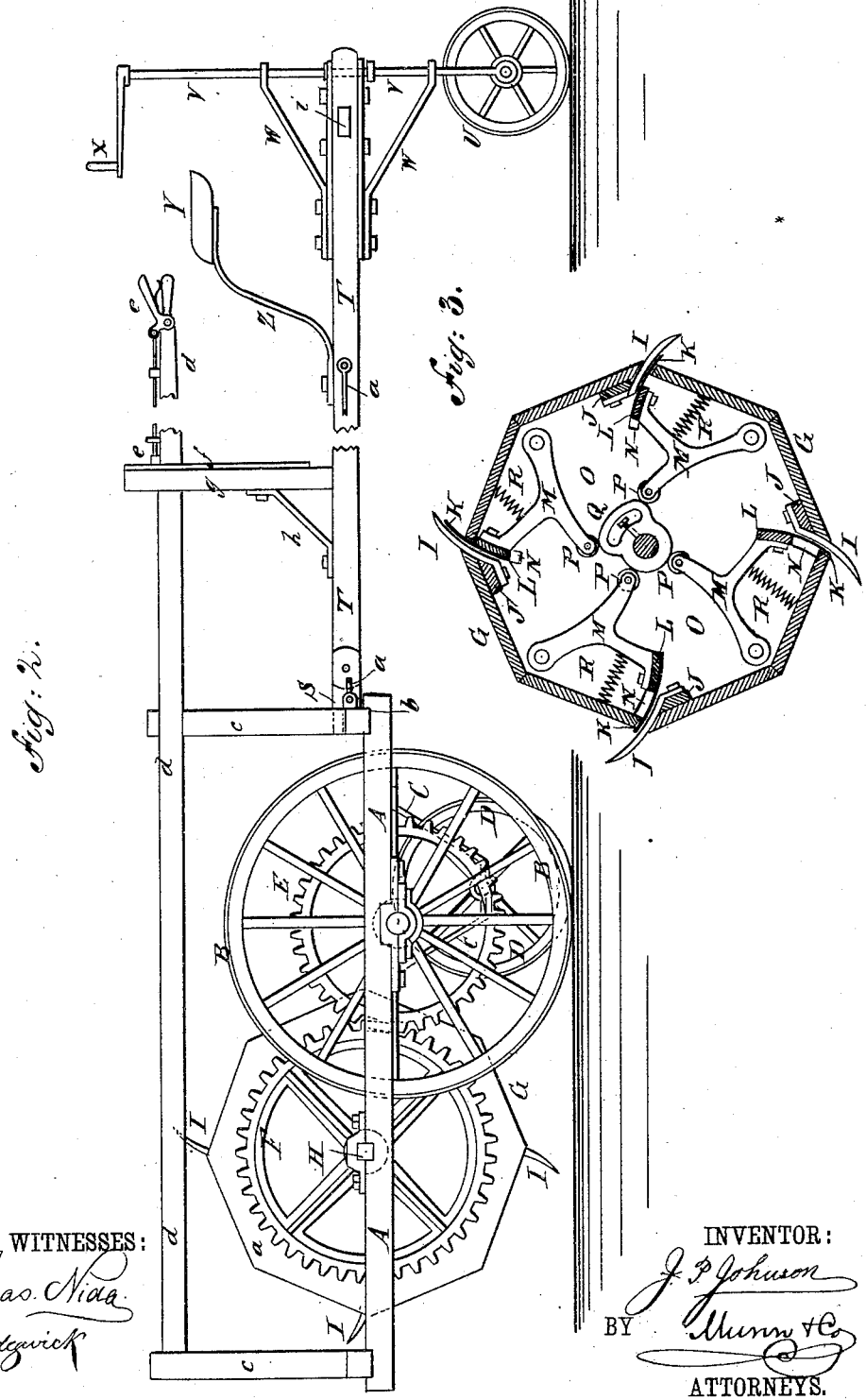

UNITED STATES PATENT OFFICE.

JAMES PETER JOHNSON, OF WILLMAR, MINNESOTA.

FIELD-WEEDER.

SPECIFICATION forming part of Letters Patent No. 345,903, dated July 20, 1886.

Application filed November 6, 1885. Serial No. 182,025. (No model.)

*To all whom it may concern:*

Be it known that I, JAMES PETER JOHNSON, of Willmar, in the county of Kandiyohi and State of Minnesota, have invented a new and useful Improvement in Field - Weeders, of which the following is a full, clear, and exact description.

Reference is to be had to the accompanying drawings, forming a part of this specification, in which similar letters of reference indicate corresponding parts in all the figures.

Figure 1 is a plan view of my improved field-weeder, parts being broken away. Fig. 2 is side elevation of the same, parts being broken away. Fig. 3 is a sectional elevation of the weeding-cylinder, taken through the line $y\ y$, Fig. 1.

The object of this invention is to provide field-weeders constructed in such a manner as to pull or comb out wild mustard without injury to the wheat or other grain among which the said wild mustard may be growing.

The invention consists in the construction and combination of various parts of the machine, as will be hereinafter fully described.

A represents the frame of the machine, which is made rectangular in form, and with double side bars at its off side, as shown in Fig. 1.

To and between the forward parts of the double side bars of the frame A is journaled the drive-wheel B.

To the front bar and the forward part of the near side bar of the frame A are attached hangers C, to which is journaled a small wheel, D.

To the end of the inner journal of the drive-wheel B is rigidly attached a gear-wheel, E, the teeth of which mesh into the teeth of the gear-wheel F, attached to the end of the octagonal or other shaped hollow cylinder G. The cylinder G revolves upon an axle, H, the ends of which are rigidly attached to the side bars of the frame A, which cylinder is arranged at an elevation sufficiently to enable its teeth (presently more fully referred to) to comb or pull out what is termed "wild mustard," more especially, which may be growing among wheat, and when the wheat or other grain has attained a height of from six to twelve inches.

In the cylinder G, at its alternate angles, or at suitable distances apart, are formed longitudinal slots, through which project rows of slightly-curved teeth I. The shanks of the teeth I are attached to wooden bars J, secured to the interior surface of the shell of the cylinder G at the rear sides of the slots in the said cylinder.

Upon the forward or concaved sides of the teeth I are placed strips K, of sheet metal, and which extend the whole length of the rows of teeth I. The sheet-metal strips K, at their rear parts, are attached to wooden bars L, which are attached to the side arms of the three-armed levers M, and move out and in, in slots N in the partitions O, secured to the cylinder G. The outer arms of the three-armed levers M are pivoted to the outer parts of the partitions O, and to the ends of the inner arm of the said levers are pivoted small friction-wheels P, which, as the cylinder G revolves, roll along the cams Q, secured to the stationary axle H in such positions as to cause the strips K to be projected along the forward sides of the rows of teeth I as the said rows come to the top of the said cylinder G. The inner arms of the three-armed levers M are held against the cams Q by spiral springs R, or other suitable springs attached to the side arms of the said levers and to the sides of the cylinder G.

To hounds S, attached to the rear cross-bar of the frame A, is hinged the forward end of the tongue T, the rear end of which is supported by the small wheel U. The standard V of the wheel U is swiveled to the rear end of the tongue T, and is held in a vertical position by the braces W, attached to the upper and lower sides of the said tongue T.

To the upper end of the standard V is attached a crank, X, which projects forward, so that it can be conveniently reached and operated by the driver from his seat Y. The driver's seat Y is attached to the upper end of the standard Z, the lower end of which is attached to the tongue T. The tongue T is strengthened against side strain by a brace, $a$, the rear end of which is attached to the side of the said tongue T, and its forward end is hinged to a support, $b$, attached to the rear cross-bar of the frame A.

To the front and rear cross-bars of the frame A are attached uprights $c$, to the upper ends of which is attached the lever $d$. The rear end of the lever $d$ extends back into such a position that it can be readily reached and operated by the driver from his seat to tilt the frame A, and thus adjust the cylinder G nearer to or farther from the ground. The lever $d$ is provided with a spring-lever pawl, $e$, to engage with a catch-plate, $f$, secured to an upright, $g$, attached at its lower end to the tongue T, and strengthened in position by a brace, $h$, attached to it and to the said tongue.

To the rear end of the tongue T is rigidly attached a bar, $i$, to receive the draft, the team being hitched to the front side of said bar.

In using the machine, as it is pushed forward over the field the teeth I take hold of the branched stalks of wild mustard and draw them out of the ground, while the slender grain-stalks pass through the teeth I without being injured. As the stalks of wild mustard are carried over the top of the cylinder G the sheet-metal strips K are projected in the manner hereinbefore described, and push the said stalks off the teeth I, so that the said stalks will fall to the ground in the rear of the machine.

Having thus fully described my invention, I claim as new, and desire to secure by Letters Patent, is—

1. In a field-weeder, the combination, with the elevated cylinder carrying a series of teeth or combs, of the spring-retracted strips arranged to move in contact with said teeth and acted upon by a cam, substantially as and for the purpose set forth.

2. In a field-weeder, the combination, with the frame A, a driving mechanism, and the rotary cylinder G, having longitudinal slots at its alternate angles, and provided with rows of teeth I, of the strips K, the three-armed levers M, the cams O, and the springs R, substantially as herein shown and described, whereby the stalks will be pushed from the said teeth as they pass over the top of the said cylinder, as set forth.

JAMES PETER JOHNSON.

Witnesses:
P. M. QVIST,
CANILLA QVIST.